Patented Nov. 6, 1951

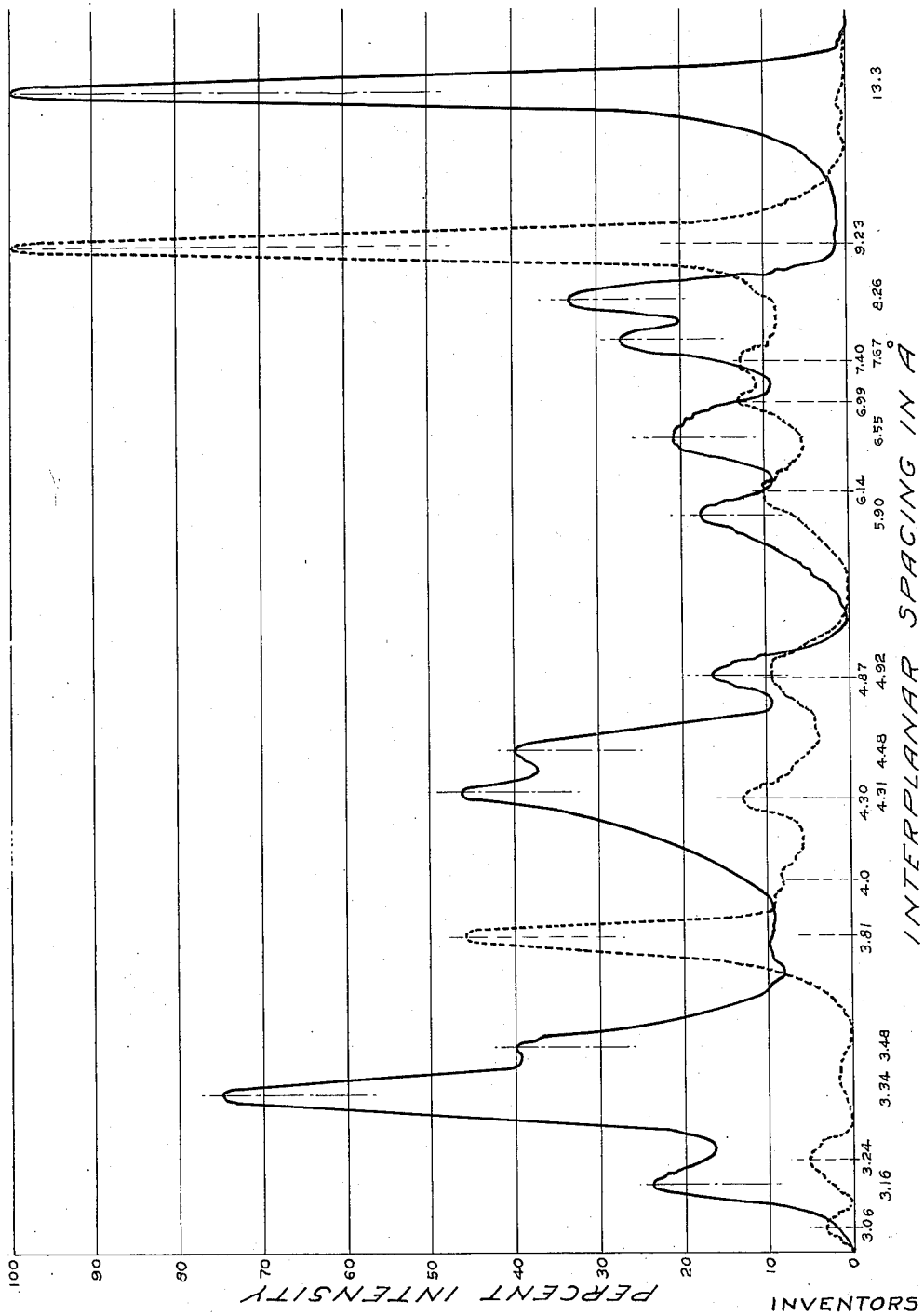

2,573,851

UNITED STATES PATENT OFFICE 2,573,851

LIGHT FAST AZOIC PIGMENTS

Harold T. Lacey, Marietta, Ohio, and Frank P. Dombroski, Jersey City, N. J., assignors to American Cyanamid Company, New York, N. Y., a corporation of Maine Application November 10, 1947, Serial No. 784,960

7 Claims. (Cl. 260—181)

This invention relates to a light fast form of the azo pigment obtained by coupling tetrazotized dianisidine and the ortho-phenetidide of 2,3-hydroxy naphthoic acid and to a process of making the pigment, which pigment has the formula:

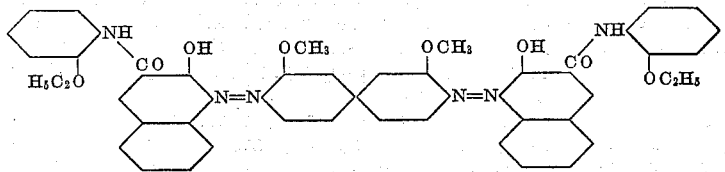

The bright blue pigment referred to above is obtained in various forms depending on the conditions of coupling of the tetrazotized dianisidine with the coupling component. When this coupling is effected in the cold in alkaline medium, an amorphous product is obtained which has good strength and brightness but very poor light fastness. A typical sample when subjected to light fastness tests in a fadeometer shows marked fading after 18 to 20 hours. When the coupling is effected in the cold in acid medium a product is obtained which for the most part is amorphous, but contains certain crystalline impurities. This product has somewhat less strength but somewhat increased light fastness of the order of about 40 hours in the fadeometer. Hot acid coupling results in a crystalline pigment which is very weak, has a light fastness of the order of magnitude of the amorphous product and has an X-ray diffraction spectrum which shows a line of maximum intensity at an interplanar spacing in the crystal of about 9.2 Å. and a line of next strongest intensity at an interplanar spacing of 3.81 Å. The deficient light fastness of the pigments prepared by the ordinary process described above greatly restricts their field of utility.

According to the present invention, it is found that a new type of crystalline pigment is obtainable when coupling is effected under acid conditions in the presence of a cationic surface active agent and particularly condensation products of long chain alkyl substituted guanidines with ethylene oxide such as for example the condensation of ethylene oxide with octadecyl guanidine. The coupling can be either cold or hot. This new crystalline form of the pigment is entirely different from that obtained by hot acid coupling in the absence of the cationic surface active agent. The crystal is characterized by an X-ray diffraction spectrum showing a line of maximum intensity at an interplanar spacing in the crystal of about 13.3 Å. and a line of next greatest intensity at an interplanar spacing of 3.34 Å. The new crystalline form shows an extraordinary light fastness ranging from 125 to 200 hours on the fadeometer; that is to say, in the order of magnitude of from 5 to 10 times the normal light fastness of the amorphous pigment.

The process of the present invention in its broader aspects is not limited to a particular cationic surface active agent. In general, cationic surface active agents are those which contain a strongly active basic group which is a part of an amine, quaternary ammonium, amidine, sulfonium, or phosphonium compound. The group must be associated with sufficient non-aromatic hydrocarbon groups to confer high surface activity. Preferably these non-aromatic groupings should include a total of at least 8 or more carbon atoms.

The cationic surface active agents include amines with a sufficiently long hydrocarbon chain such as dodecylamine, hexadecylamine, octadecylamine, octadecylmethylamine, octadecyl dimethylamine and the like. These amines are usually employed in the form of their salts such as sulfates and chlorides which are for the most part water soluble.

Another type of cationic surface active agents are those containing quaternary ammonium radicals. Typical compounds are octadecyltrimethyl ammonium salts, beta-oleylaminoethyl trimethyl ammonium chloride, 4-oleyl-aminophenyl trimethyl ammonium chloride, cetyl-benzyl dimethyl ammonium chloride, and the like. The quaternary radical may also be part of a heterocyclic compound provided there are sufficient non-aromatic groups to confer surface activity. A typical example is cetylpyridinium chloride.

Another type of cationic surface active agents are those of the amidine type. Typical compounds are stearamidine, octadecyl guanidine, octadecyl isothiuronium chloride, 2 heptadecyl-1,3-dibenzylbenzimidazolonium chloride and the like.

The preferred cationic surface active agents referred to above, namely those which are reaction products of ethylene oxide with long chain alkyl substituted guanidines, are not limited to the ethylene oxide condensation product of the alkyl substituted guanidine with ethylene oxide but include also condensation products of other alkylene oxides. The best cationic surface active agent for the process of the present invention is the reaction product of octadecyl guanidine salts with about 6 moles of ethylene oxide. It should be noted that the octadecylguanidine salt does not have to be pure. On the contrary, the technical product prepared from mixed amines gives just as good results. This technical product, while predominantly octadecylguanidine, contains some unsaturated products such as octadecenyl guanidine and also some substituted guanidines with a hydrocarbon chain of 16 carbon atoms. Such a product is normally referred to as "technical octadecylguanidine" and this term will be used through the specification in this sense.

The cationic surface active agent is usually employed in amounts less than stoichiometrical. The exact amount is not critical although, of course, there must be sufficient agent present to materially affect the surface tension characteristics of the coupling solution. In general, amounts ranging from somewhat less than 10 to 30% of the weight of the pigment give good results. More cationic surface active agent does not do any harm, but as it does not improve the result, the additional cost is not justified.

While the present invention includes only one process of preparing the new form of the blue pigment, it is not limited as far as the pigment is concerned to the method of preparation involving an acid coupling in the presence of a cationic surface active agent. On the contrary, it is possible to take a pigment which is not fast, for instance, one prepared by acid coupling in the cold in the absence of a cationic active surface agent, and transform it into the light fast crystalline form by heating at a temperature above the boiling point of water and preferably below the point at which rapid decomposition takes place. When the pigment made by cold acid coupling is so heated, the product obtained is substantially all of the light fast crystalline type defined above. When the coupling proceeds in alkaline medium, the heat treatment, if continued for a sufficient time, usually effects a marked improvement in light fastness, but sometimes does not transform all of the pigment into the new crystalline form. These methods of preparing light fast blue pigments by heat treatment are not claimed in this application as they form the subject matter of the copending application of Powell, Serial No. 785,191, filed November 10, 1947, which issued on August 8, 1950, as Patent No. 2,517,924. However, since the light fast crystalline pigment obtained by the high temperature process appears to be identical with that prepared by the acid coupling in the presence of cationic active surface agent and has the same X-ray diffraction spectrum, the present invention is not limited as far as its product claims are concerned to any particular method of preparing the new crystalline pigment.

It is not desired to limit the present invention to any particular theory. However, the following explanation appears to fit the known facts. When the coupling component is precipitated from its alkaline solution by means of acid it first comes down in an amorphous form and immediately begins to crystallize. It seems very significant that the X-ray diffraction spectrum of powdered crystalline 2,3-hydroxy o-phenetidide is substantially identical with that of the crystalline blue pigment obtained from hot acid coupling without a surface active agent. The two crystalline substances are pseudomorphs. Photomicrographs show that the coupling occurs at the surface of the arylide crystals and proceeds by diffusion into the arylide agglomerate which to all appearances remains intact until reaction is complete. This process of coupling at and through the crystal phase would be expected to impose on the pigment the crystalline form of the arylide in a manner well known to crystallographers. Apparently, that is what happens because when the arylide crystallizes under hot acid coupling, the pigment formed has the same X-ray diffraction spectrum as the coupling component. This crystalline form, produced by reason of the extraordinary constraint during formation is of low photochemical and thermodynamic stability which results in its poor light fastness. The cationic surface active agent appears to maintain the arylide in acid coupling in an amorphous form during the coupling and crystals of the pigment apparently then form in the light resistant crystalline form which is never obtained under ordinary conditions. This explanation of the function of the surface active agent may be incomplete because other methods of avoiding arylide crystallization such as adding an alcoholic solution of the arylide directly to the tetrazo solution produce a pigment of low light fastness.

The effect of high temperatures in transforming partly or completely the light unstable pigment form into the light stable crystalline form of the present invention is probably due to the fact that the crystal is changed by the high temperature and assumes the more light fast configuration.

The invention will be described in greater detail in conjunction with the drawing which shows two curves of X-ray diffraction spectra, the solid line being of the light fast pigment produced by the present invention and the dotted line the light unstable crystalline pigment obtained by hot acid coupling. This latter diffraction spectrum is substantially the same as that of crystals of the 2,3-hydroxy naphthoic acid o-phenetidide. The abscissae are of the customary non-uniform scale of interplanar crystal spacing as drawn by a recording spectrometer which uses a mechanically movable Geiger counter and a balancing recorder. The vertical scale is in percent of the strongest line. This has necessitated expanding the vertical scale of the dotted line curve as the absolute intensity of the line of maximum intensity at 9.2 A. is somewhat less than the absolute intensity of the strongest line of the solid curve. The figures for the various spectral lines of the solid and dotted curves are as follows:

| Solid Curve | | Dotted Curve | |
| --- | --- | --- | --- |
| A° Interplanar Spacing | Per Cent Intensity of Strongest Line | Interplanar Spacing | Per Cent Intensity of Strongest Line |
| 13.3 | 100 | 9.23 | 100 |
| 8.26 | 31 | 7.40 | 14 |
| 7.67 | 26 | 6.99 | 13 |
| 6.55 | 20 | 6.14 | 11 |
| 5.90 | 17 | 4.87 | 9 |
| 4.92 | 15 | 4.30 | 12 |
| 4.48 | 37 | 4.00 | 9 |
| 4.31 | 43 | 3.81 | 44 |
| 3.48 | 38 | 3.24 | 5 |
| 3.34 | 76 | 3.06 | 3 |
| 3.16 | 24 | | |

The invention will be described in detail in the following specific examples in which the parts are by weight.

EXAMPLE 1

65.5 parts of 3,3'-dimethoxybenzidine are slurried with 3500 parts of water. 178 parts of 38% hydrochloric acid are added and the product stirred to complete solution at room temperature. The temperature of the 3,3'-dimethoxybenzidine dihydrochloride solution is then adjusted to 0° C. and a solution of 39.0 parts of sodium nitrite in 390 parts of water adjusted to 0° C., is added rapidly with good agitation. The resulting tetrazo solution is stirred at 0° C. until tetrazotization is complete. An excess of nitrous acid is preferably maintained throughout the tetrazotization period. At the end of this time the mineral acidity of the tetrazo is neutralized by adding 75 parts of sodium acetate crystals.

An alkaline solution of 2,3-hydroxynaphthoic acid ortho-phenetidide is prepared by slurrying 173 parts of the phenetidide in 500 parts of water, adjusting the temperature of the slurry to 50° C. and adding a solution of 39 parts of sodium hydroxide dissolved in 195 parts of water. This solution is alkaline to Clayton yellow paper. A sodium acetate solution, prepared by dissolving 100 parts of sodium acetate crystals in 500 parts of water is added. 5000 parts of cold water is then added and the temperature adjusted to 0° C. by adding ice. A solution in 100 parts of glacial acetic acid of 34.0 parts of the reaction product of octadecylguanidine carbonate with 6 moles of ethylene oxide adjusted to 0° C., is added rapidly with good stirring to the alkaline solution of the 2,3-hydroxynaphthoic acid ortho-phenetidide. Precipitation results.

The resultant suspension of 2,3-hydroxynaphthoic acid ortho-phenetidide and the cationic agent is immediately added very rapidly with good agitation to the 3,3'-dimethoxybenzidine tetrazo solution at 0° C. and the charge stirred for several hours. The suspension of the blue pigment is heated up gradually to 90° C. and held at 90° until development is complete. The positive test to alkaline R salt for excess tetrazo generally disappears at approximately 70° C. At this point the coupling is complete and the final developed blue pigment is filtered hot, washed free of acid and dried at 60° C.

A cationic agent is essential for a bright, blue, fast-to-light product. When the coupling is made without a cationic agent, but otherwise using the same procedure, the resulting pigment is very dull and dirty when tested as a 50 to 1 zinc oxide reduction in varnish by rubout test and the tint shows an appreciable fade after 25-50 hours in the fadeometer, whereas the tint of the pigment prepared with the above cationic agent shows such a remarkable improvement in light fastness that only a very slight fade in the fadeometer is observed after 200 hours. Substantially the same results are obtained with the cationic agent prepared from the reaction product obtained from technical octadecylguanidine which also contains some hexadecylguanidine.

The usual alkaline coupling without a cationic agent gives a strong reddish blue pigment which is very poor in light fastness (the tint fades very badly in the fadeometer in 16 hours).

Photomicrographs of samples of 2,3-hydroxynaphthoic acid ortho-phenetidide precipitated with and without the above cationic agent show that immediately after precipitation both samples are amorphous. After a few seconds the sample without the cationic agent begins to crystallize. Although the sample with the cationic agent slowly crystallizes, relatively smaller crystals are produced. The difference in crystal size is quite evident from microscopic examination. Immediate coupling of the phenetidide containing the cationic agent gives the greenish-blue pigment of remarkably improved light fastness as compared to the reddish blue fugitive pigment produced from the phenetidide precipitated without the cationic agent.

A comparison of the light fastness and physical properties of the blue pigment prepared according to Example 1 with the properties of the pigments obtained by acid or alkaline coupling without a cationic agent is shown in Table 1. Pigment A represents a pigment prepared by the conventional alkaline coupling in the absence of the cationic agent. Pigment B is acid coupled under the conditions described in the example except that the cationic surface active agent is omitted, and pigment C is the pigment produced by Example 1, pigment D is produced by hot acid coupling in the absence of a cationic surface active agent, and pigment E is prepared by the method of Example 1 using hot acid coupling instead of cold acid coupling.

*Table 1*

| Pigment | A | B | C | D | E |
|---|---|---|---|---|---|
| 1 Light fastness (Fadeometer hrs.). | 16–20 | 25–50 | 200 (approx.) | 20 | 125–200. |
| 2 Microscopic examination of coupling component. | no crystals (in solution). | crystals formed very rapidly. | crystallization slower than (B) crystals much smaller. | crystals, and formed very rapidly. | crystallization slower than (B) and crystals much smaller. |
| 3 X-ray study of pigment. | amorphous (no crystals). | some crystals [1] | mainly crystalline X-ray diffraction spectrum solid line of the drawing. | mainly crystalline, X-ray diffraction spectrum dotted line of the drawing. | crystalline X-ray diffraction spectrum of solid line. |

[1] The crystals do not exhibit the diffraction spectra of pigment C.

The figures given for fadeometer time in cases A, B and D represent the time at which there was a definite and serious fading. In the cases of pigments C and E, there is a very slight change in color at about 100 to 125 hours on the fadeometer. The change is barely detectable and for practical purposes is not significant. No further change in color takes place, and it is possible that the slight change, which can barely be detected, may be due to the presence of traces of impurities which are not light fast.

EXAMPLE 2

Blue pigments were prepared following the procedure of Example 1, but in place of the reaction product of octadecylguanidine carbonate with ethylene oxide, corresponding amounts of other cationic agents were used. The cationic agents have the following approximate chemical constituent: Substituted amide of alkyl phosphate (12 carbons), substituted amide of alkyl phosphate (18 carbons), cetyl benzyl dimethyl ammonium chloride.

The resulting pigments were substantially similar to those produced by Example 1 and show high light fastness.

EXAMPLE 3

65.5 parts of 3,3'-dimethoxybenzidine are slurried with 3500 parts of water. 178 parts of 38% hydrochloric acid are added and the product stirred to complete solution at room temperature. The 3,3'-dimethoxybenzidine dihydrochloride solution is at room temperature, and a solution of 39.0 parts of sodium nitrite in 390 parts of water at room temperature is added rapidly with good agitation. The resulting tetrazo solution is stirred at room temperature until tetrazotization is complete. An excess of nitrous acid is preferably maintained throughout the tetrazotization period. At the end of this time the mineral acidity of the tetrazo solution is neutralized by adding 75 parts of sodium acetate crystals. The tetrazo solution is heated to 75° C.

An alkaline solution of 2,3-hydroxynaphthoic acid ortho-phenetidide is prepared by slurrying 173 parts of the phenetidide in 500 parts of water, adjusting the temperature of the slurry to 50° C. and adding a solution of 39 parts of sodium hydroxide in 195 parts of water. The mixture is stirred until complete solution is obtained. This solution is alkaline to Clayton yellow paper. A sodium acetate solution, prepared by dissolving 100 parts of sodium acetate crystals in 500 parts of water is added. 5000 parts of cold water is then added and the temperature adjusted to 0° C. by adding ice. A solution in 100 parts of glacial acetic acid of 50.0 parts of the reaction product of octadecylguanidine carbonate with 6 moles of ethylene oxide adjusted to 0° C. is added rapidly with good stirring to the alkaline solution of the 2,3-hydroxynaphthoic acid ortho-phenetidide. The resulting suspension is heated to 95° C.

The heated suspension of 2,3-hydroxynaphthoic acid ortho-phenetidide is added very rapidly, with good agitation, to the heated tetrazo solution. The coupling is complete in a short time. The temperature is adjusted to 90° C. and held at 90° until development is complete. At this stage the final suspended blue pigment is filtered hot, washed free of acid and dried at 60° C.

In the above method of coupling at a high temperature, the cationic agent is necessary for a bright, light fast product. Without the cationic agent the pigment is dull, dirty, reddish blue, weaker, and very poor in light fastness. The tinctorial properties of the pigment made by hot coupling are even superior to those of the pigment made by cold coupling and the same excellent light fastness is obtained.

EXAMPLE 4

Blue pigments were prepared following the procedure of Example 3, but in place of the reaction product of octadecylguanidine carbonate with ethylene oxide, corresponding amounts of other cationic agents were used. The cationic agents have the following approximate chemical constituent: Substituted amide of alkyl phosphate (12 carbons), substituted amide of alkyl phosphate (18 carbons), $$R—CO—NH—C_2H_5—N—R'_3Cl$$

(R is $C_{17}$ or $C_{18}$; R' is methyl, ethyl)

EXAMPLE 5

300 parts of pigment slurry prepared from o-dianisidine and 2-hydroxy-3-naphthoic o-phenetidide by cold acid coupling, according to the procedure of Example 1 except that no dispersing agent is used, is removed from the coupling solution before filtration and placed in a glass-lined autoclave at 200° C. for one hour. The resulting pigment shows crystal character similar to Pigment C of Example 1, and in the fadeometer shows slight fading after 125 hours, which does not increase much up to 200 hours.

EXAMPLE 6

A specimen of pigment prepared from o-dianisidine and 2-hydroxy-3-naphthoic o-phenetidide by cold acid coupling according to the procedure of Example 1, except that no dispersing agent is used, is boiled in aqueous calcium chloride solution (B. P. 105° C.) for two hours. The resulting pigment is of excellent light fastness, though somewhat weaker and duller than the pigment of Example 6 conditioned by autoclaving.

EXAMPLE 7

65.5 parts of 3,3'-dimethoxybenzidine are slurried with 3500 parts of water and 178 parts of 38% hydrochloric acid and stirred to complete solution at room temperature. The temperature of the 3,3'-dimethoxybenzidine dihydrochloride solution is then adjusted to 0° C., and a solution of 39 parts of sodium nitrite in 390 parts of water, adjusted to 0° C., is added rapidly with good agitation. The resulting tetrazo solution is stirred until tetrazotization is complete at 0° C. An excess of nitrous acid is preferably maintained throughout the tetrazotization period. At the end of this time, the mineral acid acidity of the tetrazo is neutralized by the addition of 175 parts of sodium acetate crystals. An alkaline solution of the 2,3-hydroxynaphthoic ortho-phenetidide is prepared by slurrying 173 parts of the phenetidide with 6000 parts of water, adjusting the temperature to 100° C. and adding a solution of 100 parts of sodium hydroxide in 500 parts of water. This solution is alkaline to Clayton yellow paper. The temperature is then adjusted to 0° C. with ice.

The tetrazotized 3,3'-dimethoxybenzidine solution (0° C.) is added to the alkaline solution of 2,3 - hydroxynaphthoic acid ortho - phenetidide over a short coupling period, and the resulting coupling stirred for one hour. The pH of the coupling, which is approximately 11.0, is adjusted to 4.5 by the addition of 150 parts of glacial acetic acid. The suspension of blue pigment is heated to 95° C. and maintained at this temperature until formation of the pigment is complete. The slurry then is adjusted to pH to 4.2, and placed in a nickel-lined autoclave for two hours at 200° with a small quantity of the same pigment prepared crystalline by coupling in the presence of a surface active agent. The resulting product is of excellent light fastness but slightly weaker and duller than material prepared according to Example 1 or Example 5.

This application is in part a continuation of our copending application Serial No. 544,334, filed July 10, 1944, now abandoned.

We claim:

1. A light fast crystalline form of the pigment having the chemical formula:

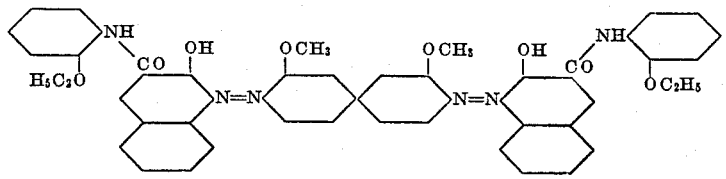

and characterized by an X-ray diffraction spectrum in which the line of greatest intensity is at an interplanar crystal spacing of 13.3 Å. and the second most intense line is at an interplanar spacing of 3.34 Å.

2. A method of preparing a crystalline azoic pigment of increased light fastness which comprises coupling under acid conditions tetrazotized 3,3'-dimethoxy-benzidine with a freshly precipitated form of the o-phenetidide of 2-hydroxy-3-naphthoic acid, a coupling taking place in the presence of a sufficient amount of cationic surface active agent to produce a product characterized by an X-ray diffraction spectrum in which the line of greatest intensity is at an interplanar crystal space of 13.13 Ångstrom and the second most intense line is at an interplanar space of 3.34 Ångstrom.

3. A method according to claim 2 in which the cationic surface active agent is a reaction product of octadecyl guanidine with ethylene oxide.

4. A method according to claim 3 in which the reaction product is octadecyl guanidine with six mols of ethylene oxide.

5. A process according to claim 2 in which the o-phenetidide of 2-hydroxy-3-naphthoic acid was produced by precipitation in the presence of a cationic surface active agent.

6. A method according to claim 5 in which the cationic surface active agent is a reaction product of octadecyl guanidine with ethylene oxide.

7. A method according to claim 6 in which the reaction product is octadecyl guanidine with six mols of ethylene oxide.

HAROLD T. LACEY.
FRANK P. DOMBROSKI.

REFERENCES CITED

The following references are of record in the file of this patent:

UNITED STATES PATENTS

| Number | Name | Date |
|---|---|---|
| Re. 19,527 | Laska et al. | Apr. 9, 1935 |
| 2,123,740 | Murphy et al. | July 12, 1938 |
| 2,261,626 | Lang | Nov. 4, 1941 |
| 2,477,661 | Scully | Aug. 2, 1949 |
| 2,517,924 | Powell | Aug. 8, 1950 |

OTHER REFERENCES

Mosher, Proc. Amer. Assoc. of Textile Chemists and Colorists, Jan. 20, 1941, pages 32 and 37.